United States Patent [19]

Ikeda

[11] Patent Number: 4,784,864
[45] Date of Patent: Nov. 15, 1988

[54] FOOD WRAPPER FOR A DRIED SEAWEED COVERED MASS OF RICE

[75] Inventor: Tetsuo Ikeda, Otsu, Japan

[73] Assignees: Ishida Systems Engineering Co., Ltd., Kyoto; Hayashiya Syokuhin Co., Ltd., Nagano, both of Japan

[21] Appl. No.: 139,067

[22] Filed: Dec. 24, 1987

Related U.S. Application Data

[63] Continuation of Ser. No. 35,247, Apr. 6, 1987, abandoned, which is a continuation of Ser. No. 663,915, Oct. 24, 1984, abandoned.

[30] Foreign Application Priority Data

| Oct. 25, 1983 | [JP] | Japan | 58-165653 |
| Oct. 25, 1983 | [JP] | Japan | 58-165654 |
| Oct. 25, 1983 | [JP] | Japan | 58-165655 |
| Oct. 25, 1983 | [JP] | Japan | 58-165656 |
| Jun. 26, 1984 | [JP] | Japan | 59-96377 |

[51] Int. Cl.$^4$ .................. B65D 65/09; B65D 81/32
[52] U.S. Cl. .................. 426/115; 206/627; 206/629; 206/630; 206/639; 229/87 F; 383/38; 383/907; 426/120; 426/122; 426/124
[58] Field of Search .................. 229/87 F, 87 R; 206/604-610, 613-614, 619-623, 624-626, 627-629, 632-634, 635, 548, 804,630; 383/38-40, 111-113, 907; 426/110-115, 115-118, 119-122, 130, 124

[56] References Cited

U.S. PATENT DOCUMENTS

| 892,074 | 6/1908 | Obici | 383/111 X |
| 1,253,269 | 1/1918 | Moeller | 383/907 X |
| 2,099,412 | 11/1937 | Seidler | 206/627 X |
| 2,103,389 | 12/1937 | Salfishberg | 206/629 X |
| 3,114,643 | 12/1963 | Boston et al. | 426/122 X |
| 3,172,796 | 3/1965 | Gülker | 383/907 X |
| 3,379,363 | 4/1968 | Sutphen, Jr. | 206/627 X |
| 3,382,132 | 5/1968 | Kugler | 383/907 X |
| 3,676,887 | 7/1972 | Klein | 383/84 X |
| 3,873,735 | 3/1975 | Chalin et al. | 206/604 X |
| 3,941,307 | 3/1976 | Van Malderghew | 206/620 X |
| 4,189,050 | 2/1980 | Jensen et al. | 383/84 X |
| 4,230,728 | 10/1980 | Teruka | 229/87 F |
| 4,251,552 | 2/1981 | Uno et al. | 426/115 |
| 4,256,256 | 3/1981 | Meyers | 383/40 |

FOREIGN PATENT DOCUMENTS

| 56-64290 | 6/1981 | Japan . |
| 57-10542 | 3/1982 | Japan . |
| 57-42318 | 9/1982 | Japan . |
| 58-136447 | 9/1983 | Japan . |
| 59-41697 | 10/1984 | Japan . |
| 62-23735 | 6/1987 | Japan . |
| 304466 | 9/1968 | Sweden | 206/632 |
| 376846 | 5/1964 | Switzerland | 206/629 |
| 241448 | 10/1925 | United Kingdom | 206/629 |

Primary Examiner—Stephen Marcus
Assistant Examiner—Bryon Gehman
Attorney, Agent, or Firm—Armstrong, Nikaido, Marmelstein & Kubovcik

[57] ABSTRACT

A wrapper for wrapping two different foods, such as a mass of compressed rice and a dried seaweed sheet, separately. The wrapper comprises an inner trianglar-shaped bag made of food wrapping synthetic resin material for storing a mass of rice therein and an outer trianglar-shaped bag made of the same material enclosing said inner bag and provided with a tear-off portion. At serving, the tear-off portion is torn off in order to expose the lower end of the outer bag. Then the inner bag is pulled out of the outer bag so that the dried seaweed sheet sticks around the mass of rice. A method for fabricating the wrapper is also disclosed.

8 Claims, 7 Drawing Sheets

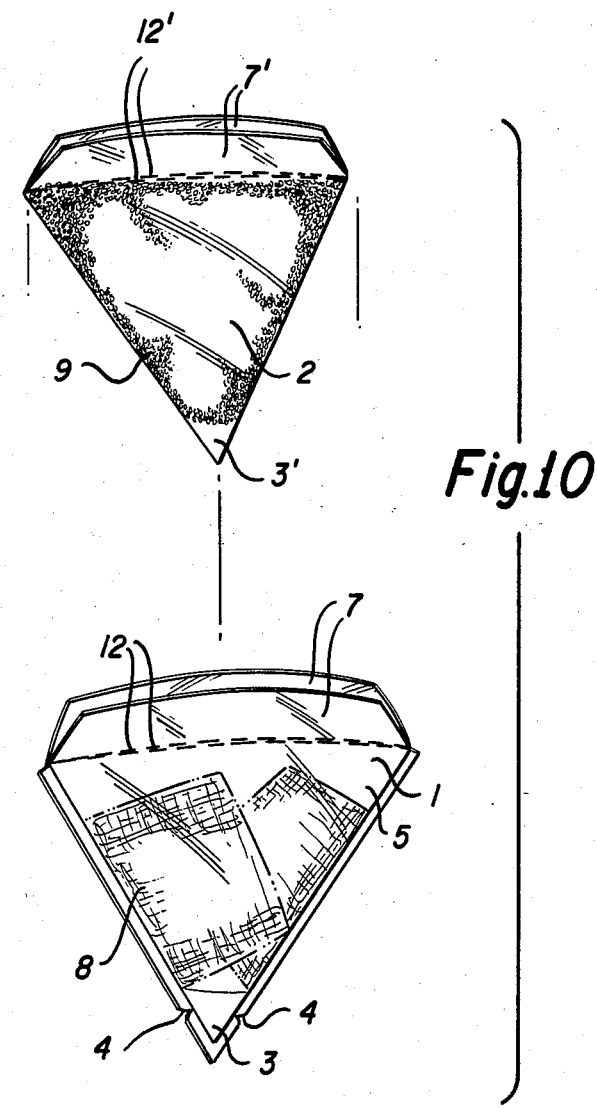

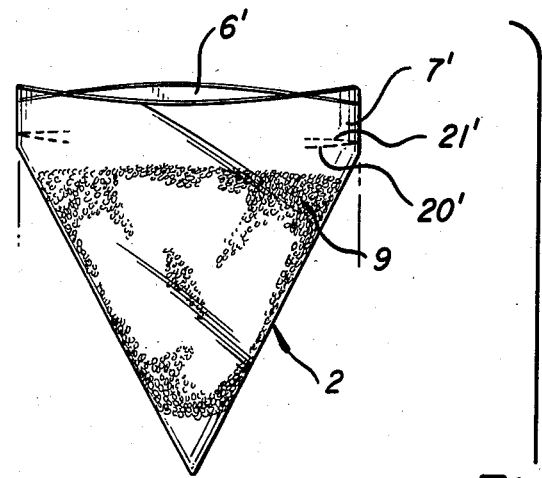
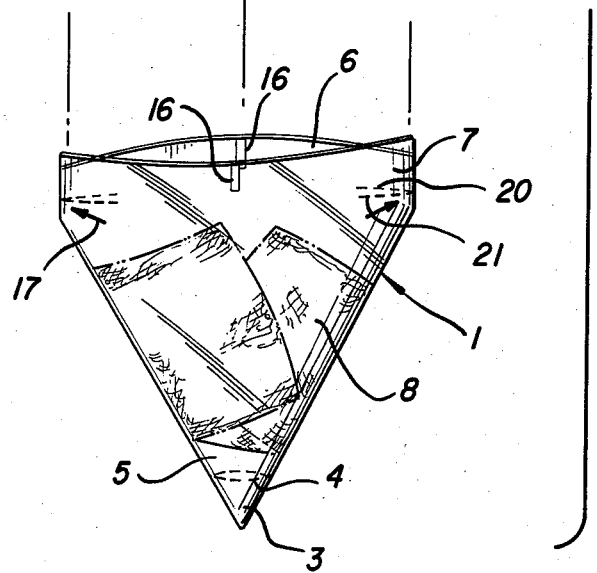
Fig.11

FOOD WRAPPER FOR A DRIED SEAWEED COVERED MASS OF RICE

This application is a continuation of application Ser. No. 035,247 filed Apr. 6, 1987, now abandoned which was a continuation of Ser. No. 663,915 filed Oct. 24. 1984, now abandoned.

BACKGROUND OF THE INVENTION

The present invention relates to a wrapper for two different foods such as a mass of compressed rice and a dried seaweed sheet. The so-called ONIGIRI shown in FIG. 1, formed of a mass of rice 9 compressed by hand or in a mold and having usually an approximately triangular shape, is a convenient food typically consumed as a snack or for a picnic, however, since the mass of rice by itself tastes too plain, a dried seaweed sheet 8 is usually applied to cover this mass of rice to improve the taste. In producing this kind of mass of compressed rice with a dried seaweed wrapping therearound, a certain amount of rice is fed into a mold of triangular, circular or rectangular shape to form a mass of compressed rice of the desired shape, and then a dried seaweed sheet 8 is applied to wrap the mass of compressed rice 9 to produce a final product.

Thereafter the mass of rice 9 produced by this method is wrapped with an appropriate food wrapping synthetic resin sheet such as polyethylene, polypropylene, or the like for sale to consumers. In the prior processes for producing a mass of rice, the productivity rate for forming the mass of rice itself is relatively high; however, the wrapping process totally depends upon manual handling such as inserting the mass of rice into an envelope and closing the envelope to seal the mass of rice. Therefore, problems such as decreased in productivity or crumbling of the formed shape owing to the complexity of the wrapping process are encountered. Moreover, sanitary problems caused by manual handling, or difficulty in breaking open the envelope at serving also arise. In order to overcome these problems, several wrappings for a seaweed covered mass of rice has been proposed.

In Japanese Utility Model publication No. 57-10542, for example, a wrapping for producing a seaweed covered mass of rice is disclosed which comprises an inner triangular bag containing a mass of rice therein and having an opening thereatop, and an outer triangular bag of synthetic resin sheet for containing this inner triangular bag therein and provided with a cut-way opening through which the inner triangular bag is to be pulled out. On the other hand, in Japanese Utility Model publication No. 57-42318, there is described a wrapping for producing a dried seaweed covered mass of rice using an inner triangular bag provided with a slit which can be pulled out of the top opening of an outer triangular bag.

In the known wrappings, however, the top end of the outer envelope is completely open to the air so that it does not solve the problem as seen in the prior art that the dried seaweed sheet becomes moistened by air entering through the top end of the bag and loses its relish or taste.

In both prior art wrapping instruments, in addition to the serious defect that an apparent opening exists in either the outer or inner bags, the closure of the upper openings of the outer and inner triangular bags is rudimentary and sealing incomplete. The methods employed consist of folding the flaps one upon another and closing them by a seal member, so that they can not achieve the purpose of sealing the food therein.

Therefore, these prior art wrappings present a serious sanitary defect in that they cannot prevent contamination as by bacteria, or infiltration by moisture, insects or dust owing to the incompleteness of sealing. Moreover, there is the further problem that, because of incomplete sealing of the inner triangular bag, the moisture of the mass of rice may affect or damage the relish or taste of the dried seaweed. Furthermore, in the wrappings using these kinds of bags, the operation for inserting the mass of rice into the bag is a manual handling so that these known wrapper instruments are not suitable for a mass production system. The object of the present invention is to provide a new wrapping for a seaweed covered mass-of-rice which overcomes the above-mentioned defects. Another object of this invention is to provide a new, inexpensive wrapper for a seaweed covered mass-of-rice offering easy handling and good sanitary preservation.

SUMMARY OF THE INVENTION

This invention provides a wapper for wrapping two different foods such as a mass of compressed rice 9 an a dried seaweed sheet 8 separately and putting them together at serving without directly touching them.

The wrapper of this invention comprises an outer triangular-shaped bag 1 made of a food wrapping synthetic resin material and an inner triangular-shaped bag made of similar material, wherein the outer triangular-shaped bag 1 is provided with a tear-off portion for detaching the lower end 3 thereof and a cover 7 at the periphery 22 of a top opening 6.

In another embodiment of this invention, at least one of the openings of the outer or inner triangular-shaped bag 1 or 2 is provided with a detachable heat sealing portion which is to be heat welded after the insertion of the mass of rice 9.

In a further embodiment, both lower ends 3 and 3' of the outer and inner triangular-shaped bags 1 and 2 are spot welded together. When the openings of the outer and inner envelopes 1 and 2 are heat welded to produce a heat sealing portion 11, tear-off portions 20,20' may be provided so that both envelopes 1 and 2 can be reopened without particular effort. Also, marks for showing the locations of the centering point of the tear-off portion of the envelope or the direction for tearing can be printed on the outer bag prior to packaging of the foodstuff.

BRIEF DESCRIPTION OF THE DRAWINGS

Hereinafter, the wrapper of the present invention is explained in detail with reference to the attached drawings, in which.

FIGS. 10a and 10b illustrate still another embodiment of the wrapper of the present invention.

FIGS. 11a and 11b illustrate further still another embodiment of the wrapper of the present invention.

DETAILED DESCRIPTION OF THE INVENTION

Figure 1:
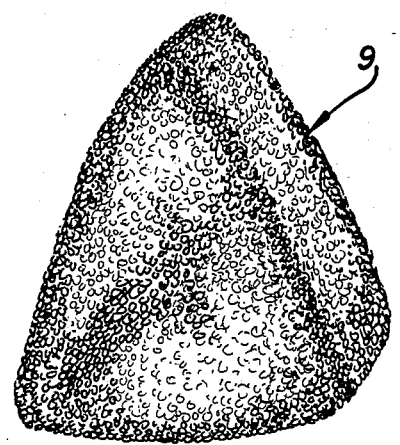
FIG. 1 is a perspective view of a formed mass of rice.
Figure 2:
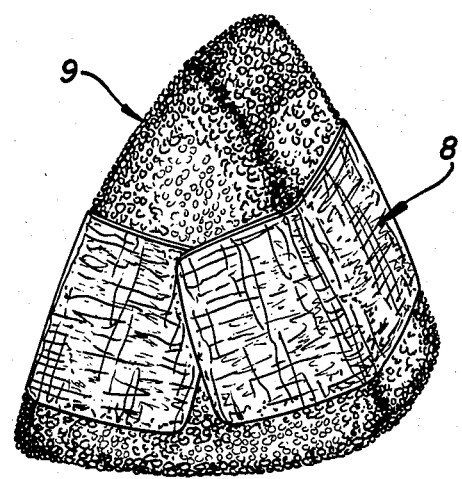
FIG. 2 is a perspective view of showing the mass of rice with a dried seaweed wrapping therearound.
Figure 3:
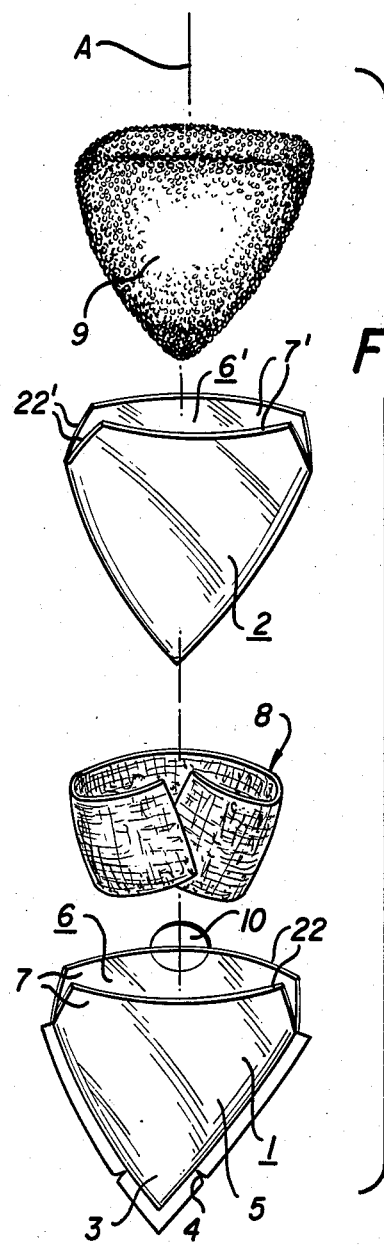
FIGS. 3a, 3b, 3c and 3d illustrate a wrapping sequence using the wrapper of the present invention.
Figure 4:
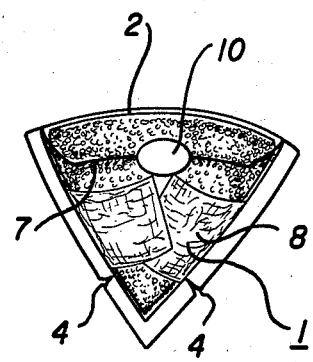
FIG. 4 illustrates a sealed wrapped foodstuff, using the wrapper of the present invention, as the completed stage of the sequence of FIGS. 3a-3d.
Figure 6A:
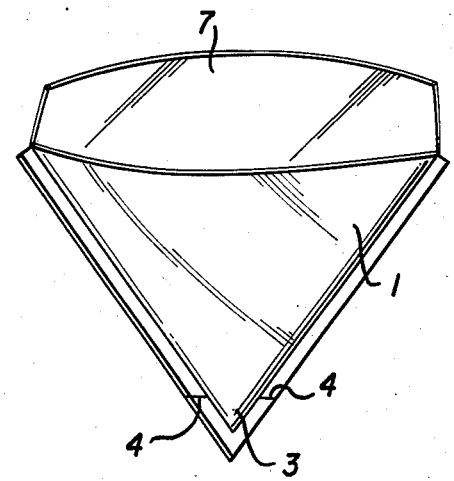
FIGS. 6a and 6b illustrate alternative embodiments of an outer bag of the wrapper of the present invention.
Figure 6B:
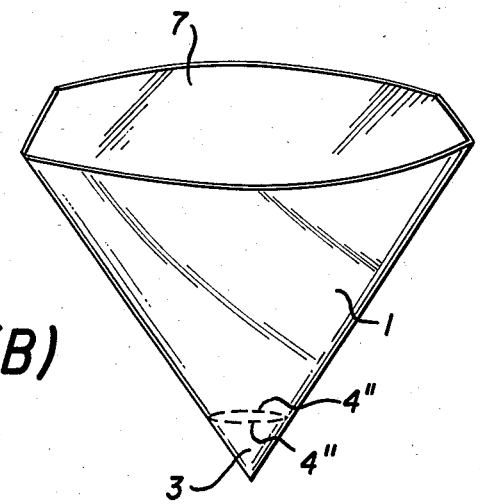

FIGS. 3–4, a transparent outer triangular-shaped bag 1 made of a sheet of water nonpermeable, soft synthetic resin such as polypropylene resin or the like is provided with a main body 5, a tear-off portion 4 for easy detachment of a lower end 3 of the outer bag 1 and flaps 7,7 at the periphery 22 of an upper opening 6 which are used to close the opening. The flaps 7,7 may be two pieces facing each other as shown in FIG. 3d and may have different height; however, only one piece may be provided at one side of the periphery of the opening 6 as shown in FIG. 6b. The inner triangular-shaped bag 2 is made of a sheet of opaque or translucent water nonpermeable, soft synthetic resin material such as polyethylene resin and the like and has a shape approximately the same as that of the outer bag 1 but having no tear-off portion 4.

The tear-off portion 4 provided at the vicinity of the lower end 3 of the main body 5 can be arbitrarily formed as a notch 4, slit 4' or perforation 4'' (FIGS. 6a, 6b) extending across the lower end 3 of the outer bag 1. As to the soft, synthetic resin material used for the inner or outer bags, any well-known thermoplastic resin sheet which when heated will not yield any harmful components to the dried seaweed 8 or mass of compressed rice 9 can be used. Polypropylene is especially suitable because of is easy tearing-off capability from a tear-off portion, such as a perforation, slit or notch, as the material's orientation is extremely improved owing to the elongation it undergoes during the sheet forming process, and because of its high sealability.

On the other hand, flaps 7,7 provided at the periphery 22 of the opening 6 of the outer bag 1 may be folded one upon another. The flaps 7,7 are required to have a sufficient folded area as to substantially shield both the mass of compressed rice 9 in the inner bag 2 and the dried seaweed sheet 8 placed between the inner surface of the outer bag 1 and the outer surface of the inner bag 2 from infiltration of the outside air. However, flaps 7,7 can take any shape, such as rectangular or tapezoidal, as long as they satisfy the above condition. Moreover, if necessary, a similar flap 7' can be provided at the periphery 22' of the opening 6' of the inner bag 2 in order to improve the shielding effect on the mass of rice from the outside air.

How to use the wrapper of this invention will be explained in detail hereinafter.

At first, as shown in FIG. 3, a dried seaweed sheet 8 is gently coiled with a slight inclination about a center axis A, and then inserted into the inner surface of the outer bag 1. On the other hand, a mass of compressed rice 9 formed by a mold or the like is placed into the inner bag 2, then the bag 2 is inserted into the inner surface of the coiled dried seaweed 8 placed in the outer bag 1. The flaps 7',7' of the inner bags 2, if any, are folded one upon the other and so are the flaps 7,7 of the outer bag 1. Then flaps 7,7 and 7',7' are closed by an appropriate seal member 10. FIG. 4 shows this sealed state. Another suitable method consists of inserting the mass of rice 9 into the inner bag 2, wrapping the dried seaweed sheet 8 around the inner bag 2 and inserting them into the outer bag 1.

Figure 5A:
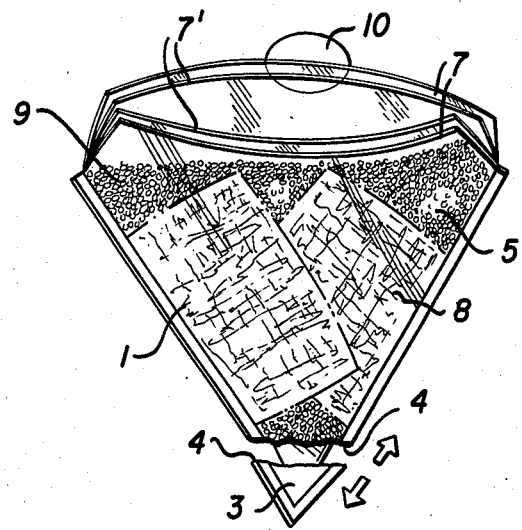
FIGS. 5a and 5b illustrate a manner of opening the wrapper of the present invention for serving of a wrapped foodstuff.
Figure 5B:
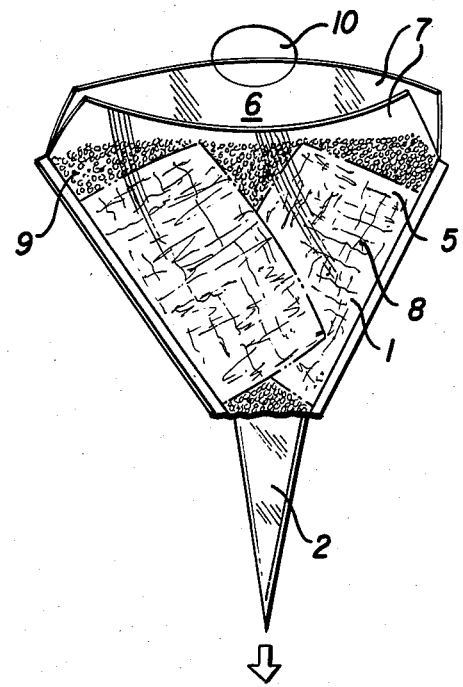

In taking this mass of rice 9 with dried seaweed sheet 8 therearound out of the triangular bag to serve it, the seal member 10 is peeled off, the flaps 7,7 and 7',7' are pulled outwardly, and then the lower end 3 is detached from the main body 5 of the outer bag 1 along the tear-off portion 4,4' or 4'' (FIG. 5A). Then the consumer pulls the exposed lower end of the inner bag 2 sticking out of the tear-off portion 4,4' or 4'' along the direction of an arrow mark as shown in FIG. 5B in order to take only the inner bag 2 out of the outer bag 1.

During the pulling-out process of the inner bag 2, the dried seaweed sheet 8 gradually sticks around the outer surface of the mass of rice 9 and the foodstuff is ready to serve when the inner bag 2 is completely taken out of the outer bag 1.

In the practice of the present invention, if the flaps 7',7' are folded one upon another immediately after the mass of rice 9 is inserted into the inner bag 2, each step can proceed individually so that assembly-line production techniques can be applied to packaging of the foodstuffs.

Figure 7:
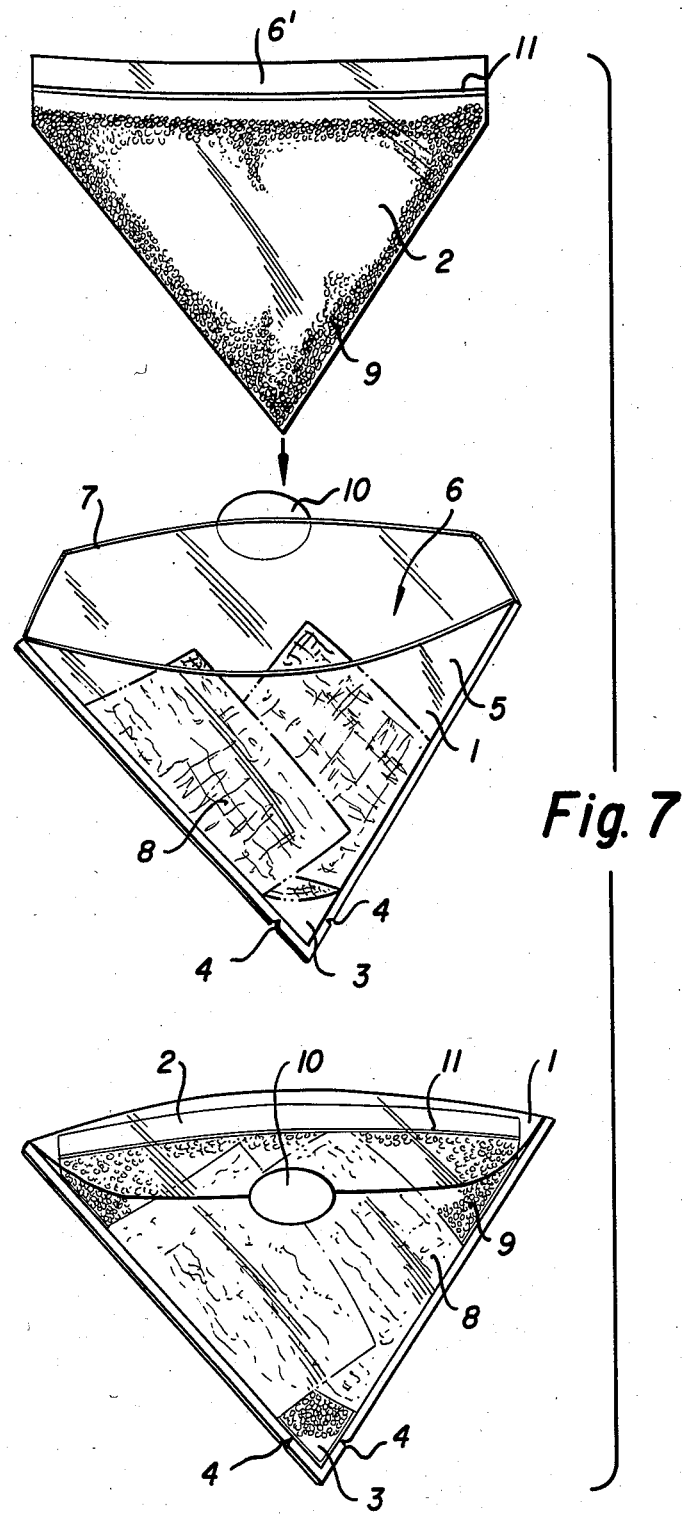
FIGS. 7a, 7b and 7c illustrate another embodiment of the wrapper of the present invention.

FIGS. 7A and 7B show a second embodiment of the present invention and illustrates both the tearing-off state of a heat seal portion and the pulling-out state of the inner bag 2. Provided at the opening 6' of the inner bag 2 is a detachable heat seal portion 11 which seals the opening 6' after the mass of rice 9 is inserted therein. Besides the inner bag 2 being provided with this seal 11, the inner bag 2 has a shape substantially similar to that of the outer bag 1. The outer bag 1 is provided with a flap 7 and a seal member 10 by which the bag 1 is closed. Although the heat seal 11 is provided at the opening 6' of the inner bag 2 in this embodiment, it also can be provided only at the opening 6 of the outer bag 1 or at the openings 6' and 6 of both inner and outer bags 1 and 2, as occasion demands.

Figure 8A:
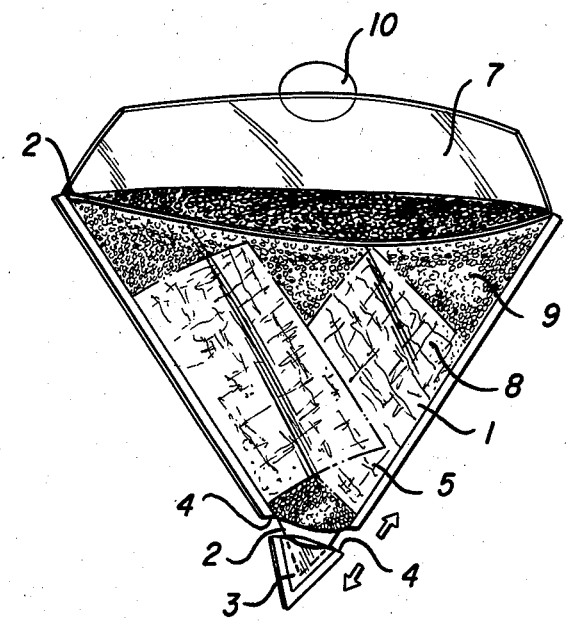
FIGS. 8a and 8b illustrate a manner of opening the wrapper of another embodiment of the present invention for serving of a wrapped foodstuff.
Figure 8B:
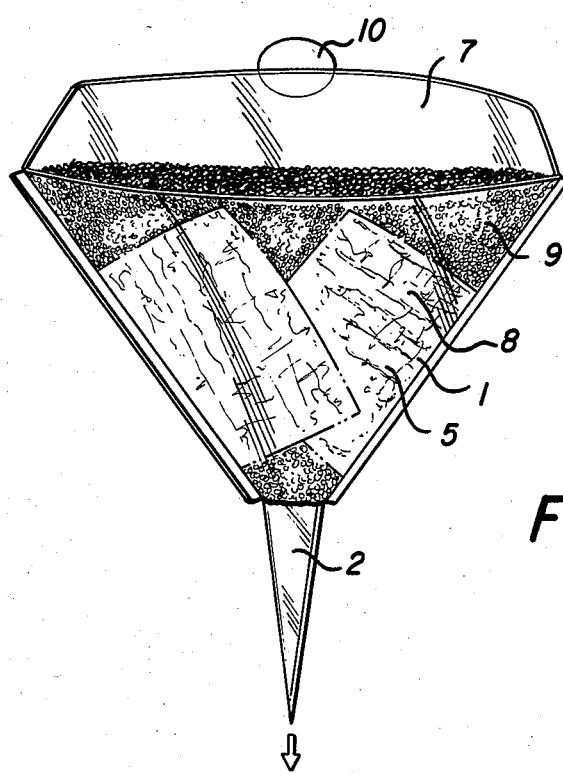

As another embodiment, it is possible to heat seal both openings 6 and 6' of the outer and inner bags 1 and 2 at the same time. The order of steps to use this wrapper is approximately the same as the first embodiment. Through the opening 6' of the inner bag 2, the mass of compressed rice 9 is inserted therein and the opening 6' is heat sealed. The inner bag 2 containing the mass of compressed rice 9 is then inserted into the outer bag 1 where the dried seaweed sheet 8 was previously placed. The flap 7 of the outer bag 1 is closed by an appropriate seal member 10 (FIG. 7c). Instead of previously inserting the dried seaweed sheet 8 in the outer bag 1, it may be coiled around the inner bag 2 already containing the mass of rice 9 therein and the inner bag 2 with the dried seaweed sheet 8 therearound is then inserted into the outer bag 1. In providing the heat seal portion of the outer bag 2, it can be formed by providing two flaps 7,7 and heat sealing them together after inserting the inner bag 2. In order to serve the mass of compressed rice 9 with the dried seaweed 8 therearound, as shown in FIG. 8, the seal member 10 is peeled off to open the flap 7 and the sealed portion 11 is cut or torn off to open the inner bag 2. The lower end 3 is detached from the main portion 5 of the outer bag 1 by tearing it off along the tear-off portion 4 (FIG. 8a) to expose the lower end of the inner bag 2 outside where, in the next step, it is pulled along the direction of the arrow marks out of the outer bag 1. By pulling of the inner bag 2 out, the dried seaweed sheet 8 is caused to directly stick around the mass of rice 9 gradually from the top and finally a mass of rice 9 with the dried seaweed 8 is produced when the inner bag 2 is completely pulled out. The mass of rice 9 is taken out of the inner bag 2 to serve or eat.

Figure 9A:
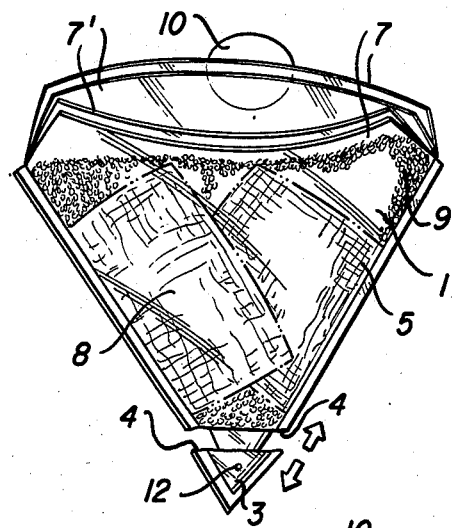
FIGS. 9a and 9b illustrate a further embodiment of the wrapper of the present invention.
Figure 9B:
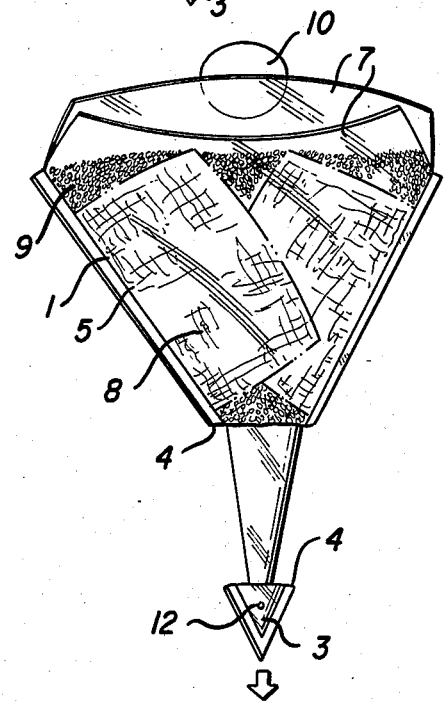

A third embodiment of ths invention is shown in FIGS. 9A and 9B. Lower end 3' of the inner bag 2 is adhered to lower end 3 of the outer bag 1 at spot weld 12 by heat sealing a bonding agent or the like. Among the various adhering methods, the heat seal by spot welding is the most appropriate means because of the food being contained in the bags and the operational convenience of spot welding.

The procedural steps to assemble this embodiment are substantially the same as those of the first and second embodiments except the final steps of the spot welding of the two lower ends 3 and 3' at point 12. In this embodiment, the lower end 3 of the outer bag 1 is detached off from the main bdy 5 thereof along the tear-off portion 4. Then the inner bag 2 is pulled out of the outer bag 1 by holding the detached lower end 3 of the outer bag 1 attached to the lower end 3' of the inner bag 2.

In a fourth embodiment shown in FIG. 10, both flaps 7,7 and 7'7' of the outer and inner bags 1 and 2 are provided with tear-off portions 12 and 12' so that they can be detached along the tear off portions 12 and 12' after they are heat welded together. In this embodiment the flaps 7 and 7' are heat sealed.

In a fifth embodiment as shown in FIGS. 11, one of the flaps 7,7 at one side of the outer bag 1 is larger than the flap of the other side for handling convenience in opening. Similarly, one flap 7' of inner bag 2 may be made larger. Tear-off portions 20,20 and 20'20' in the form of a perforation, slit or notch, are provided at both edges of the inner and outer bags 1 and 2 to extend inwardly for about 18–20 mm in length and are used to re-open bags 1 and 2. 16 and 17 designate registration marks that show the positions of the centers of flaps 7,7, for properly aligning flaps 7,7 during forming of the sealing portion and the tear-off portion 20, respectively.

Figure 12:
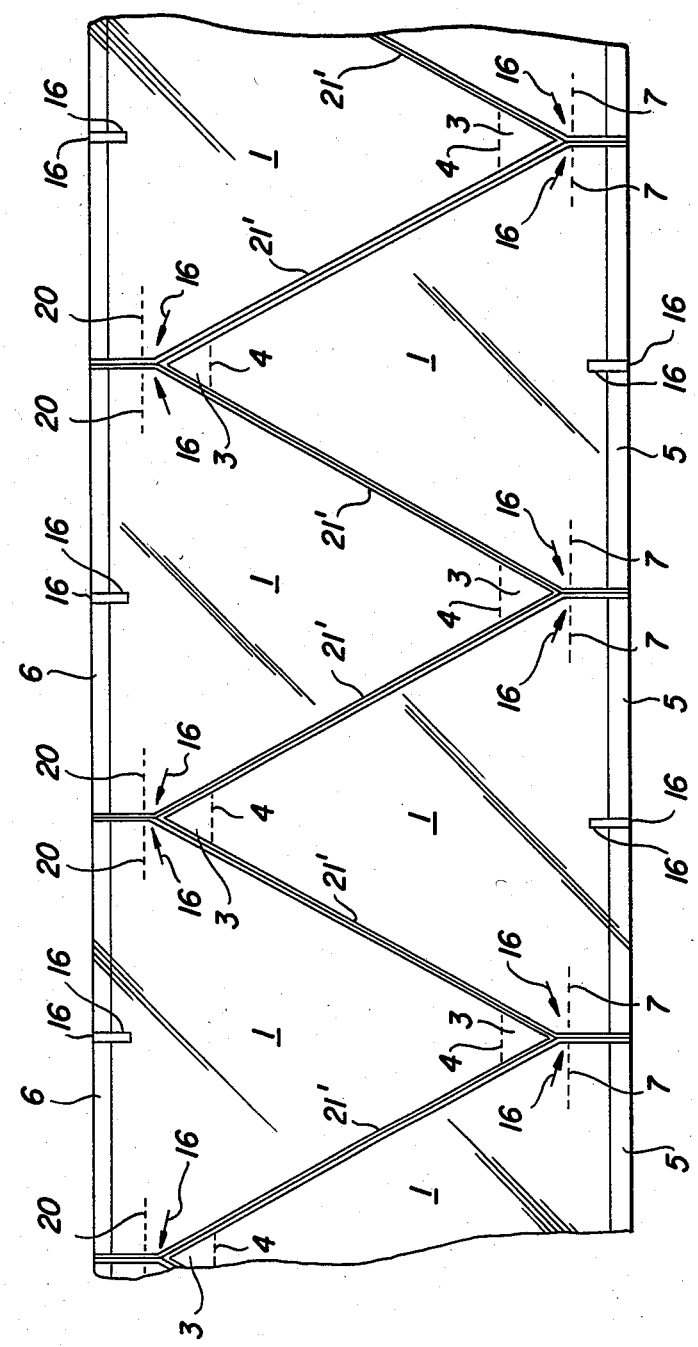
FIGS. 12 illustrates a method for producing a plurality of outer bags of the wrapper of the present invention according to the method of the present invention.

FIG. 12 shows the method used to produce the outer bag 1 which is explained in detail hereinafter. If necessary, the marks for first and second tear-off portions 4, 20 and the center of the flap 7, or the heat seal portion, the written directions for how to open this instrument, or a trademark are first printed upon the surface of a thermoplastic resin sheet. In printing these marks or letters, it is preferable to use a printing roll that has a transfering surface which produces the marks and letters facing opposite directions on two adjacent outer bag halves 1,1. Two printed sheets are placed one upon another as shown in FIG. 12, the edge portions 21' of the outer bag 1 are produced by a well-known heat seal device, and first tear-off portion 4 at the lower end 3 and second tear-off portions 20 extending inwardly from both edge portions 21' at the vicinity of the opening 6 of the outer bag 1 are also formed. In the embodiment shown in FIG. 12, the first tear-off portion 4 is a perforation across the lower end 3 of the outer bag 1 and second tear-off portions 20,20 are perforations of, for example, about 18 mm in length which extend inwardly from both edges 21' of the outer bag 1. After forming first and second tear-off portions 4 and 20, the thermoplastic resin sheet is cut at the center of each sealed edge 21' so as to produce two equal-width edges 21', 21' for each outer bag 1. The inner envelope 2 is also produced by a similar method except the printing process for the marks and letters, and the tear-off portion forming process may be elminated.

In a case where the marks are printed, they are adjusted to register with one another during the heat welding process. As described above, the mass of rice 9 and dried seaweed 8 are individually stored in complete sealing so that the dried seaweed sheet never gets dampened owing to the moisture of either the mass of rice 9 or the outside air.

As mentioned previously, although the illustrated exemplary embodiments are shaped as triangular-shaped bags 1,2, the bags 1,2 can take any shape such as rectangle, trapezoid or the like.

Also, as will be apparent to those skilled in the art, this double bag wrapper can find application not only for the mass of rice and seaweed sheet foodstuff, but also similar materials that need separate storing.

What is claimed is:

1. A food wrapper, comprising:
   a first food of a mass of rice
   an inner bag means of a synthetic resin material for storing said first food therein, said inner bag means having a triangular shape, the top side of said inner bag means being completely heat sealed and provided with a first tear-off means for producing an opening when said heat-sealed top side is torn off;
   an outer bag means for storing said heat-sealed inner bag means therein, said outer bag means having a triangular shape and an opening at the top thereof, at least one flap at the top thereof and a second tear-off means at a lower end portion thereof for detaching said lower end portion of said outer bag means; and
   a second food of a dried sea-weed positioned between said heat sealed inner bag means and outer bag means and surrounding at least a portion of said inner bag means, wherein said inner bag means sealingly separates said first and second foods so that moisture in said first food does not contact said second food, whereby when said top of said heat sealed inner bag means is opened by tearing off said first tear-off means and said lower end portion of said outer bag means is detached from said second tear-off means, said inner bag means can be removed through an opening created at the lower portion of said outer bag means by detachment of said lower end portion.

2. The food wrapper according to claim 1, wherein registration marks are printed on the top of the outer bag means.

3. The food wrapper according to claim 1, wherein the lower ends of said inner and outer bag means are connected together such that upon detachment and removal of said lower end of said outer bag means, said inner bag means is also removed from said outer bag means.

4. The food wrapper according to claim 1, said first tear-off means is a line and extends for a certain length inwardly from both side edges of the bag means.

5. The food wrapper according to claim 1, said second tear-off means is defined by a notch.

6. The food wrapper according to claim 1, said second tear-off means is defined by a slit.

7. The food wrapper according to claim 1, said second tear-off means is defined by a perforation.

8. The food wrapper according to claim 1, wherein said inner bag means and said outer bag means are heat sealed together at the tops thereof.

* * * * *